United States Patent
Isley

[11] 3,712,282
[45] Jan. 23, 1973

[54] TEMPERATURE CONTROL SYSTEM FOR SUPERCHARGED INTERNAL COMBUSTION ENGINE

[75] Inventor: Walter F. Isley, Grosse Pointe, Mich.

[73] Assignee: Teledyne Industries, Inc., Los Angeles, Calif.

[22] Filed: Jan. 22, 1971

[21] Appl. No.: 108,736

[52] U.S. Cl............................................123/119 CD
[51] Int. Cl..............................................F02b 37/04
[58] Field of Search..........123/119 CD; 60/13, 39.25

[56] References Cited

UNITED STATES PATENTS

| | | | |
|---|---|---|---|
| 1,371,444 | 3/1921 | Sherbondy | 123/119 CD |
| 3,044,683 | 7/1962 | Woolenweber | 60/13 |
| 3,389,553 | 6/1968 | Hardy et al. | 60/13 |
| 2,559,623 | 7/1951 | Holmes | 60/39.25 |
| 3,049,865 | 8/1962 | Drayer | 60/39.25 |
| 1,508,707 | 9/1924 | Moss | 123/119 CD |

FOREIGN PATENTS OR APPLICATIONS 690,458  7/1964  Canada ..................60/13

Primary Examiner—Douglas Hart
Assistant Examiner—Warren Olsen
Attorney—Hauke, Gifford and Patalidis

[57] ABSTRACT

A temperature control system for a supercharged internal combustion engine in which the supercharger is activated by the engine. The system regulates the temperature of the air fed to the engine induction manifold by providing a selective bypass of air around the cooling unit responsive to ambient air temperature and to the level of pressure in the manifold.

6 Claims, 2 Drawing Figures

INVENTOR
WALTER F. ISLEY
BY Hauke, Gifford & Patalidis
ATTORNEYS

TEMPERATURE CONTROL SYSTEM FOR SUPERCHARGED INTERNAL COMBUSTION ENGINE

BACKGROUND OF THE INVENTION

The field to which this invention relates is that of highly supercharged internal combustion engines such as diesel engines in which the air is heated by compression in a supercharger. It is of advantage to cool the air introduced into the cylinders to maintain a suitable temperature level for combustion within the engine cylinders. The cooling means used to reduce the air temperature after compression in the supercharger is normally designed to meet the maximum requirement of high power operation. Accordingly, the cooler has excessive cooling capability for light load operation of the engine. This results, when operating at light load, and/or low ambient temperatures in providing air input at temperatures which are somewhat lower than desired for proper combustion within the engine cylinders. Various prior art systems involve specialized temperature-pressure responsive valves and elaborate control systems for maintaining the proper temperature level during starting, at slow speeds, or with low load operating conditions.

SUMMARY OF THE INVENTION

The present invention solves the problem of temperature control of supercharged air in a cooling system in direct communication with the source of compressed air. Introduced in the system is a bypass valve which selectively diverts the compressed air from passing through the cooling system in response to the pressure level existing in the manifold and/or in response to ambient air temperature. During light load operation when low pressure rise exists through the supercharger, and/or when ambient temperatures are low, the compressed air is substantially bypassed about the cooling unit to maintain the required elevated temperature level of the air entering the engine cylinders.

DESCRIPTION OF THE DRAWINGS

Figure 1:
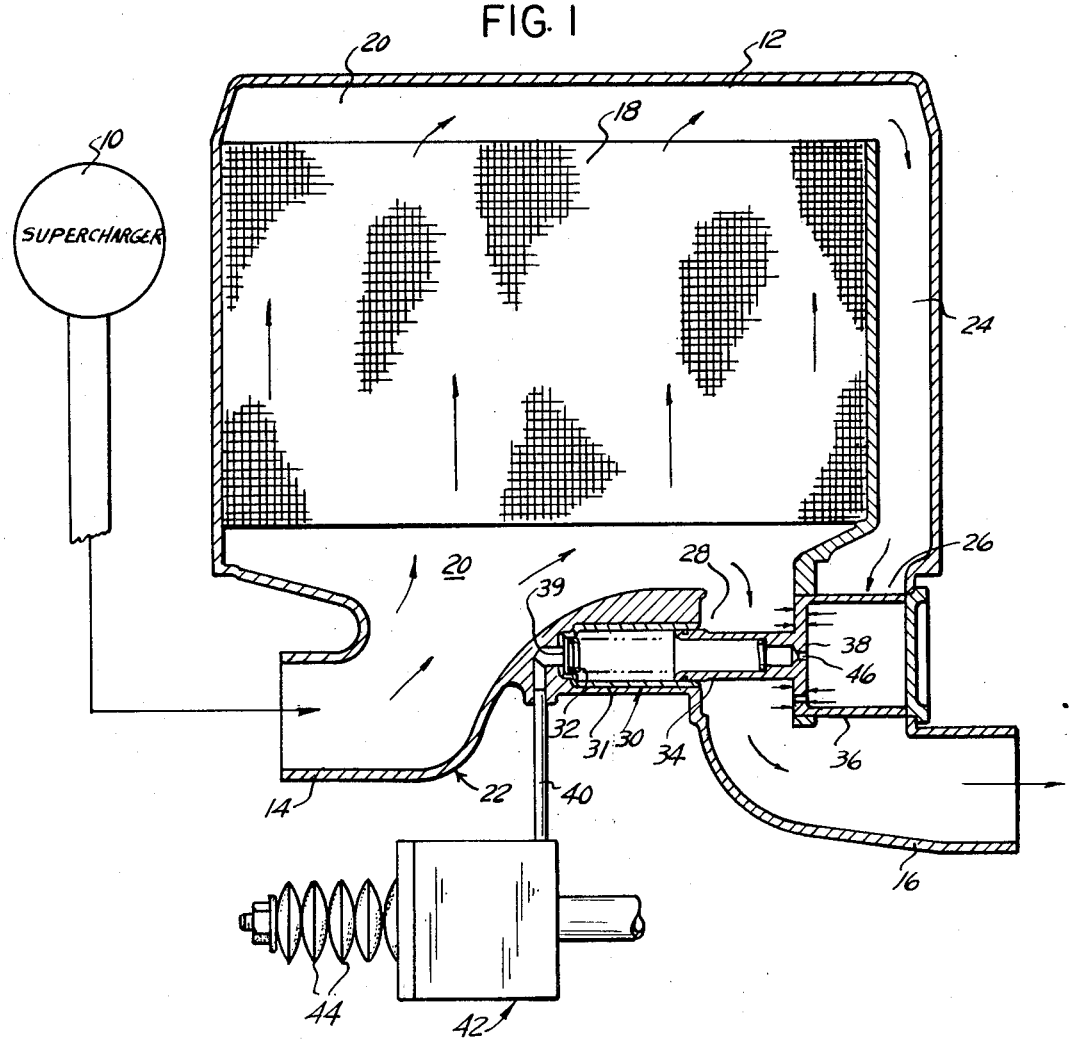
FIG. 1 is a combined diagrammatic, longitudinal sectional view of a system for cooling supercharged air according to the invention.

With particular reference to FIG. 1, there is shown a compressor and cooling system for a highly supercharged type of internal combustion engine, which system includes a supercharger 10, a cooling means 12 and a manifold 22. The supercharger 10 as is conventional is operated either by a suitable mechanical connection from the engine itself or it may be powered by an exhaust turbine. The cooling means 12 is preferably of the heat exchanger type and includes a cooler core 18 supported in a chamber 20 to provide the maximum cooling surface available to reduce the temperature of the pressurized air. The several flow paths of the air are indicated by the arrows. The manifold 22 is connected at the lower end of the cooling chamber 20. Manifold 22 includes a first conduit 14 and a second conduit 16 with the former conduit communicating between the supercharger 10 and the cooling chamber 20 and the latter conduit communicating between the passage 24 at the right side of chamber 20 and the engine cylinders, not shown. It will be seen that there are formed at the lower right end of manifold 22 a pair of laterally spaced ports 28, 26. A bypass means is included in the manifold 22 for providing a selective bypass of pressurized air which would otherwise pass upwards through the cooling chamber 20, through the cooler core 18 and thence to the engine cylinders for combustion. The bypass means includes a valve assembly 30 which is of the spring biased plunger type and includes a cylindrical housing body 31, a spring 32, a plunger 34 and, mounted at the right hand end of plunger 34, a valve cylindrical portion or operator 36. It will be seen that valve operator 36 is of a size and shape sufficient to cover the port 28, partially or completely, responsive to the differential movement of the plunger 34. It will further be seen that the right end surface of the plunger 34, which surface is designated by the numeral 38, provides an effective area against which pressure is exerted by the air that is flowing through the manifold 22, which is a function of the pressure of the pressurized air output from the supercharger 10. According to the level of air pressure in the manifold 22, there will be a movement leftwardly or rightwardly of the valve plunger 34. Assuming a constant ambient temperature, the temperature of the air discharging from the supercharger will be a function of manifold pressure. At low manifold pressure, the valve 30 ports are maintained in the position illustrated in FIG. 1 to provide relatively free flow of pressurized air through aperture 28, thus bypassing the cooler core 18 and providing air of properly elevated temperature to the engine cylinders. As the engine power output is increased and the supercharger 10 increases the pressure in manifold 22, the spring 32 of the valve 30 becomes compressed by the force of the pressure acting on the surface 38, thus moving plunger 34 leftwardly against the pressure of the compression spring 32. With the valve operator 36 in this leftward position, it forces appreciable blockage of port 28 and increases the flow of the compressed air upwardly past the cooler core 18 to suitably reduce the temperature during high power output operation. It will be noted that the surface 38 (that is the right side of the element of which it is a surface) is subject only to the pressure in the adjacent manifold space. This, however, is not true of the left side of the element. The left side is in part subjected to the pressure in the adjacent manifold space (as indicated by the small rightwardly pointing arrows). However, in the area where the plunger 34 joins the left side of said element the left surface is subject to the rightward pressure vector of the plunger. Thus, the leftward and rightward pressures on the element are substantially balanced over approximately the upper one-third and lower one-third of the element while in the approximate middle third the plunger 34 is pushing the element toward the right and the manifold pressure is pushing toward the left. It will thus be seen that with the proper selection of the valve 30 characteristics of spring rate, spring load and reaction area, particularly that at plunger 34 and at a given ambient temperature, the temperature of the compressed air entering the engine cylinders can be controlled as a function of manifold pressure.

A vent 39 is provided at the left hand end of valve 30. A downwardly extending conduit 40 communicates between vent 39 and a biasing valve means 42 to provide for selective adjustment of back pressure on the plunger 34 of the valve 30. The biasing valve, indicated generally by the numeral 42, is controlled in its operation by the lateral extension or contraction of a plurality of ambient temperature sensitive bimetallic elements 44 in a manner which will be shown more clearly in FIG. 2 hereinafter.

Figure 2:
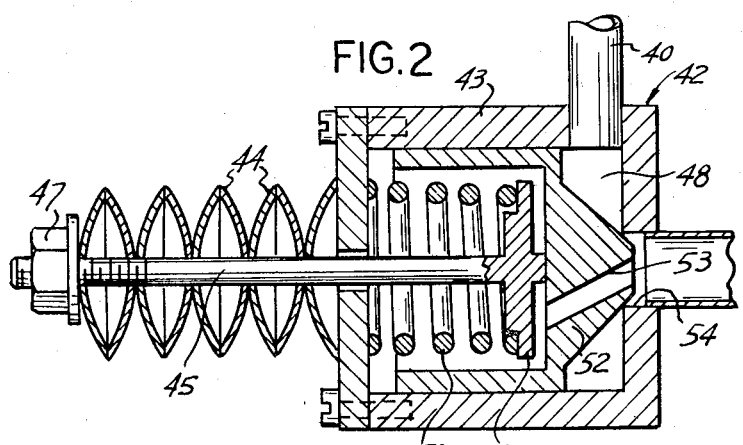
FIG. 2 is a detailed cross sectional drawing of the valve and biasing system used in conjunction with the system of FIG. 1.

With reference to FIG. 2, the valve 42 includes a valve body 43 in which a valve operating rod 45 is slidably mounted in a transverse direction. The rod 45 is threaded at its left end and has a lock nut 47 fixed thereto to mount the plurality of bimetallic elements 44 between lock nut 47 and the left end of valve body 43. Rod 45 has at its right end a lateral extension 49 engageable to retain a valve spring 50. Rod 45 additionally engages a piston 52 having a conical valve end member which engages with a port 54 at the right end of the valve 42. A suitable vent opening 53 is provided as shown. The position of piston 52 therefore regulates the air flow through port 54 as a function of spring force, bimetallic force and air pressure acting on piston 52. Thus air pressure will be controlled as a function of the ambient temperatures acting upon the bimetallic elements 44.

With reference to FIG. 1, there is included in surface 38 of valve operator 36 at the right hand end of the valve 30 an orifice 46. The orifice 46 communicates through the central body of valve 30, through the conduit 40, a chamber 48 and the port 54 provided at the right hand end of valve 42 to ambient pressure. At elevated ambient temperatures the bimetallic arcuate elements expand, or "straighten out," thus drawing their centers closer together. This results in a decreased leftward force against nut 47, permitting the rod 45 to move to the right and closing the port 54. At lowered ambient temperatures the bimetallic arcuate elements contract, pushing their centers farther apart. This results in an increased leftward force against the nut 47, permitting the rod 45 to move to the left and opening the port 54.

By way of example, if the ambient temperature is relatively high and the port 54 is closed and if the operator 36 has reached a point of equilibrium between the leftward force of the manifold pressure and the rightward force of the plunger 34 (responsive to the pressure in chamber 48); then a cooling of the ambient air causes the port 54 to open, thus permitting a flow of gas from the right of surface 38, via the opening 46 and through port 54. This latter flow tends to reduce the pressure to the right of opening 46 and the operator 36 adjusts by moving to the right. Thus cooling the ambient air results in an increase of flow through port 28 and less cooling of the supercharged gases. The pressure in chamber 48 and the resultant back pressure on valve 30 will be seen to be a function of the force of valve spring 50 and the counter force exerted by ambient temperature sensing bimetallic elements 44. Thus, the temperature of the air entering the cylinders of the engine is controlled as a joint function of manifold pressure and of ambient air temperature.

Although the system of the present invention has been described as including both the valve assembly 30 and the biasing valve 42, it is apparent that in some situations the effects of ambient temperature changes will not be critical and therefore the biasing valve 42 will not be necessary.

It will thus be seen that while there has been illustrated and described a preferred embodiment of my invention, it is to be understood that such is merely illustrative and that variations and modifications may be made therein without departing from the spirit and scope of my invention.

I claim:

1. In a supercharged internal combustion engine including compressor means driven by the engine for supplying a pressurized air input to the cylinders of said engine at a pressure higher than that of atmospheric pressure, a cooling means for said air, a first conduit means between said compressor means and said cooling means, a second conduit means connected between said cooling means and said cylinders of the engine, the improvement comprising a bypass means connected between said first and said second conduits, said bypass means responsive to the pressure level of said air input for selectively bypassing from said cooling means a predetermined portion of said pressurized air input, whereby the temperature of the air entering said cylinders is controllable as a function of pressure in said cooling means, and a pressure biasing means operatively connected to said bypass means for controlling its operation responsive to changes in ambient air temperature.

2. The combination as defined in claim 1 and in which said pressure biasing means comprises a vent port connected with said bypass means, a valve member movable toward and away from said vent port to regulate the rate of flow through said vent port, and a temperature sensing means connected with said valve to regulate the position thereof in accordance with ambient temperature values.

3. In a supercharged internal combustion engine including a supercharger for supplying a pressurized air input to the cylinders of the engine at a pressure substantially higher than that of the atmosphere, a cooling chamber for said air, a first conduit means connected between said supercharger and said cooling means, a second conduit means connected between said cooling means and said cylinder, wherein the improvement comprises a bypass valve connected between said first and said second conduits and having its movable valve operator extending into said second conduit and displaceable responsive to the level of air pressure therein, wherein said bypass valve operator includes a spring biased closure member differentially movable to cover and uncover said port between said first and second conduits, and wherein a force biasing means is connected to said operator of said bypass valve for further controlling its differential movement responsive to predetermined changes in ambient temperature.

4. The combination as set forth in claim 3 wherein said force biasing means comprises a valve for providing a back pressure to said bypass valve and a temperature sensing means, said valve operatively connected to and controlled by said temperature sensing means for providing a variable back pressure to said valve operator responsive to change in level of ambient temperature.

5. The combination as defined in claim 3 and in which said valve is disposed adjacent a vent port and is movable toward and away from said vent port to regulate exhaust from said vent port and thereby regulate back pressure to said bypass valve, and said temperature sensing means comprising bimetallic members connected to said valve to move said valve toward and away from said vent port in accordance with changes in ambient temperature.

6. In a supercharged engine including a supercharger driven by the engine for supplying a pressurized air input to the cylinders of the engine at a superatmospheric pressure, a cooling means for said air, a manifold including a first conduit means between said supercharger and said cooling means, a second conduit means connected between said cooling means and said cylinders, and a third conduit communicating directly between said first and said second conduits, wherein the improvement comprises a bypass valve operatively connected in said third conduit and having a valve operator connected to and responsive to air pressure level of said manifold; a temperature responsive means operatively connected to said valve for providing a back pressure thereto, which pressure is a function of ambient air temperature, said temperature responsive means comprising a bleed valve operatively connected to the operator of said valve; and a bimetallic temperature sensitive device operatively connected to and controlling said bleed valve responsive to changes in ambient air temperature.

* * * * *